United States Patent [19]

Aso et al.

[11] Patent Number: 5,164,563

[45] Date of Patent: Nov. 17, 1992

[54] CORE REMOVING APPARATUS

[75] Inventors: Toshiyuki Aso; Shinji Yoda, both of Oshino, Japan

[73] Assignee: Fanuc, Ltd., Minamitsuru, Japan

[21] Appl. No.: 762,003

[22] PCT Filed: Jan. 19, 1991

[86] PCT No.: PCT/JP91/00059

§ 371 Date: Nov. 18, 1991

§ 102(e) Date: Nov. 18, 1991

[87] PCT Pub. No.: WO91/10529

PCT Pub. Date: Jul. 25, 1991

[30] Foreign Application Priority Data

Jan. 19, 1990 [JP] Japan ..................... 2-8348

[51] Int. Cl.⁵ .................... B23H 11/00; B23H 7/02
[52] U.S. Cl. .................... 219/69.12; 83/167; 269/21
[58] Field of Search ............... 219/69.11, 69.12, 69.14; 269/13, 14, 16, 21; 83/100, 111, 167; 364/474.04

[56] References Cited

U.S. PATENT DOCUMENTS

| | | | |
|---|---|---|---|
| 4,745,253 | 5/1988 | Girardin | 219/69.12 |
| 4,752,665 | 6/1988 | del Santo | 219/69.12 |
| 4,996,406 | 2/1991 | Nakayama | 219/69.12 |
| 5,015,814 | 5/1991 | Morishita | 219/69.12 |

FOREIGN PATENT DOCUMENTS 63-22220 1/1988 Japan .
64-2822 1/1989 Japan .
64-71624 3/1989 Japan .

*Primary Examiner*—Geoffrey S. Evans
*Attorney, Agent, or Firm*—Staas & Halsey

[57] ABSTRACT

A core removing apparatus for removing cores from a workpiece upwardly or downwardly in dependence on the shape of each core cut out from the workpiece by means of wire-cut electric discharge machinng comprises a core removing unit (6) mounted on an electric discharge machine body. When a first operation mode is selected according to a code read from a program after a core (20) having an inverted trapezoidal shape in cross section is taper-machined, a core sucking section (16), fixed to the piston (15) of a vertical cylinder of the core removing unit, is brought in contact with the core by vertical movement and rotation of the piston, and the sucking section by which the core is sucked and held is moved upwardly to thereby pull out the core from the workpiece (19). Then, the core, moved to the outside of a core falling prohibition region by horizontal movement of the piston (13) of the horizontal cylinder, is disengaged from the core sucking section. When a second operation mode is selected according to another code associated with a core (20) of a trapezoidal shape in cross section, the core, held within the workpiece by the sucking section, is moved to a safety position at which the core never collides with a lower nozzle (8) and a lower arm which supports the nozzle even if the core falling occurs, and is disengaged from the sucking section to permit natural falling of the core, the fallen core being delivered to the outside of the prohibition region by a belt conveyor or a delivery arm.

3 Claims, 3 Drawing Sheets 19  20

19  20

CORE REMOVING APPARATUS

TECHNICAL FIELD

The present invention relates to an apparatus for removing cores, which are cut out from a workpiece by means of wire-cut electric discharge machining and which have various shapes, from the workpiece.

BACKGROUND ART

In wire-cut electric discharge machining, a table mounted with a workpiece is moved, while electric discharge is intermittently caused between a wire traveling from an upper nozzle to a lower nozzle and the workpiece disposed between the upper and lower nozzles, to thereby produce products having various shapes. In the case of cutting out a plurality of cores, each of which corresponds to a product or a cavity portion of the product, from a single workpiece, each time the cut-out machining of one core is completed, the workpiece is moved to the initial position for the cut-out machining associated with the next core. At this time, collision may occurs between the core and the lower nozzle to cause damages to the core or the lower nozzle. Conventionally, in order to obviate this awkward situation, the core cut out from the workpiece is removed from the workpiece prior to the movement of the workpiece toward the initial position for the next cut-out machining. For instance, the cut-out core is pulled out from the workpiece upwardly by the use of suction means such as magnet, suction pad, collet, etc., and is delivered to the outside of a region in which falling of the core is prohibited. Then, the core is disengaged form the suction means. Alternatively, the cut-out core is moved, with the core held within the workpiece by suction means, toward a safety position at which the core never collides with the nozzle or an arm which supports the nozzle even if falling of the core occurs. Then, the core is disengaged from the suction means, so as to permit the natural or gravitational falling of the core, and further the fallen core is delivered to the outside of the falling prohibition region by a belt conveyer or a delivering arm.

However, depending on the core shape, the core cannot be pulled out from the workpiece, or the natural falling of the core from the workpiece cannot be caused. For instance, the core which is taper-machined in a manner having its upper diameter smaller than its lower diameter cannot be pulled out from the workpiece upwardly. And, the natural falling of the core which is taper-machined to have its upper diameter larger than its lower diameter, from the workpiece, cannot be caused. Namely, according to the prior art, it is only possible to effect the core removal from the workpiece in either upward or downward direction. As a consequence, the core shape in the workpiece is restricted, resulting in such a drawback that cores formed into a trapezoidal shape in cross section and cores having a inverted trapezoidal sectional shape cannot be mixedly arranged in a single workpiece, and efficiency in utilizing the workpiece raw material is also lowered.

DISCLOSURE OF THE INVENTION

The object of the invention is to provide a core removing apparatus which is capable of removing a core, cut out from a workpiece by means of wire-cut electric discharge machining, upwardly or downwardly of the workpiece in dependence on the core shape.

In order to achieve the above-mentioned object, the core removing apparatus of the present invention comprises suction means for detachably sucking a core at an upper face of the core cut out from a workpiece; first drive means for causing the suction means to move vertically and horizontally; second drive means for causing the workpiece to move horizontally; control means for selecting either one of first and second operation modes in dependence on a core shape, and for causing the suction means and the first and second drive means to operate in the selected one operation mode. In the first operation mode, the suction means by which the core is sucked is moved upwardly of the workpiece and then to the outside of a prohibition region, and then the core is caused to be disengaged from the suction means. In the second operation mode, the suction means and the workpiece are caused to move horizontally to the outside of the prohibition region, with the core sucked by the suction means to be held within the workpiece, and then the core is disengaged from the suction means.

Preferably, in the second operation mode, the core is moved to a safety position at which the core never collides with a nozzle of an electric discharge machine and an arm which supports the nozzle, with the core held within the workpiece, and is then disengaged from the workpiece to thereby permit natural falling of the core from the workpiece onto delivery means which is operable under the control of the control means. The fallen core is delivered to the outside of the prohibition region by means of the delivery means.

As explained above, according to the present invention, either one of the first operation mode where the suction means which sucks up the core is moved upwardly of the workpiece and then to the outside of the prohibition region and thereafter the core is disengaged from the suction means, and the second operation mode where the suction means and the workpiece are horizontally moved to the outside of the prohibition region, with the core sucked by the suction means to be held within the workpiece and thereafter the core is disengaged from the suction means is selected in dependence on the core shape. Further, the suction means, the first drive means for driving the suction mean, and the second drive means for driving the workpiece are operated in the selected one operation mode. Accordingly, the core can be removed from the workpiece upwardly or downwardly in dependence on the core shape. This makes it possible to mixedly arrange cores of various shapes even in a single workpiece. This is greatly convenience.

BEST MODE FOR CARRYING OUT THE INVENTION

Figure 1:
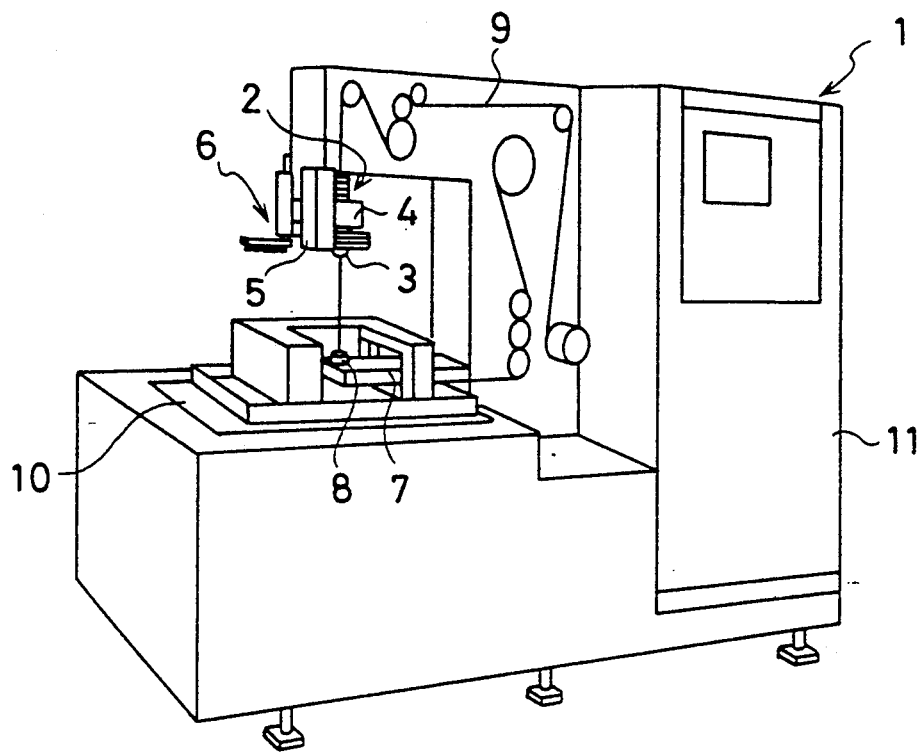
FIG. 1 is a schematic perspective view showing a wire-cut electric discharge machine equipped with a core removing apparatus according to an embodiment of the present invention.
Figure 2:
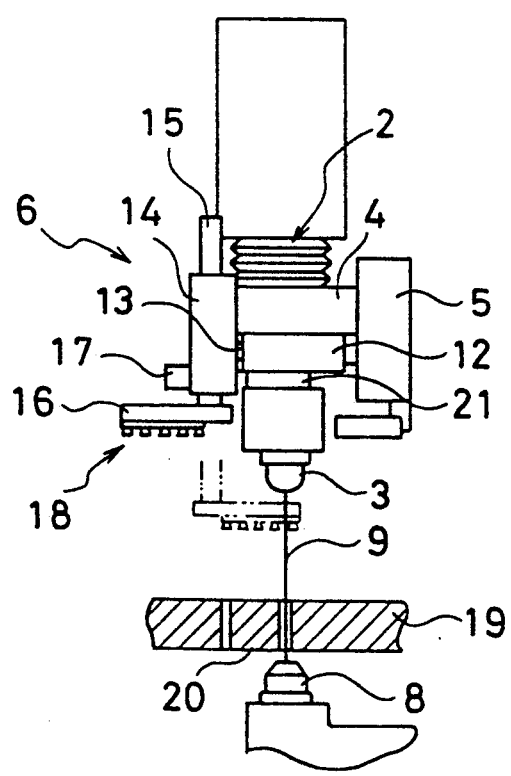
FIG. 2 is a fragmentary front view showing, partly broken, an essential part of the core removing apparatus shown in FIG. 1 and its peripheral elements.

Referring to FIGS. 1 and 2, a wire-cut electric discharge machine comprises a machine body 1, and a numerical control unit 11 of a type accommodating therein a computer, for controlling the operations of the machine body. The machine body 1 comprises a Z-axis unit 2 disposed to be movable vertically of the machine body, and a UV-axis unit 4 disposed to be movable vertically in unison with the unit 2 and movable horizontally relative to the unit 2. An automatic wire extension unit 5 is fixedly mounted to the UV-axis unit 4, and an upper wire guide having an upper nozzle 3 is fixed to the UV-axis unit through a guide support 21. A lower wire guide which has a lower nozzle 8 disposed to face the upper nozzle 3 is provided at the distal end of a lower arm 7 of the machine body 1. Reference numeral 9 denotes a wire which extends through a workpiece 19 disposed between the upper nozzle 3 and the lower nozzle 8; 10, a table operatively coupled to X-axis and Y-axis motors (not shown) and disposed to be horizontally movable; and 20, a core which is cut out from the workpiece 19 placed on the table 10.

A core removing unit 6 cooperates with the table 10 and the control unit 11 to form a core removing apparatus. The unit 6 comprises a horizontal cylinder 12 fixed to the guide support 21, and a vertical cylinder 14 fixed to the distal end of the piston 13 of the horizontal cylinder. Although not illustrated, the horizontal cylinder 12 comprises cylinder chambers which are defined by the cylinder body and the piston 13 at the opposite sides of the piston and which are communicated with a pressurized air source through a three-way valve. The horizontal cylinder is so arranged that the piston 13 is horizontally moved relative to the cylinder body in response to the supply of pressurized air to the cylinder chambers. Similarly, two cylinder chambers of the vertical cylinder 14 are communicated with the pressurized air source through another three-way valve, so that the piston 15 is vertically moved in response to the supply of pressurized air. Further, a motor 17 is mounted on the vertical cylinder 14, so that the piston 15 of the vertical cylinder 14 and a core sucking section 16 fixed to the distal end of the piston are rotated within an angular region of approximately 180 degrees, with rotation of the motor 17. Moreover, a desired number of suction pads 18, communicated with a vacuum unit (not shown) through an on-off valve, for sucking the core 20 are provided at the bottom face of the core sucking section 18.

Figure 3:
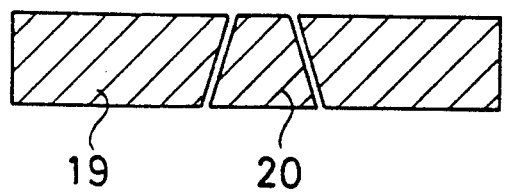
FIG. 3 is a section view showing, by way of example, a cross sectional shape of the core.
Figure 4:
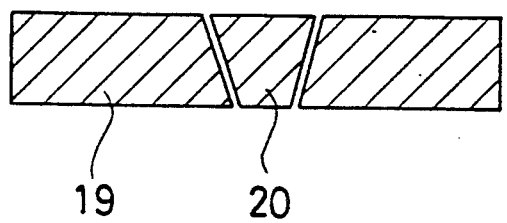
FIG. 4 is a section view showing another example of the cross sectional shape of the core.
Figure 5:
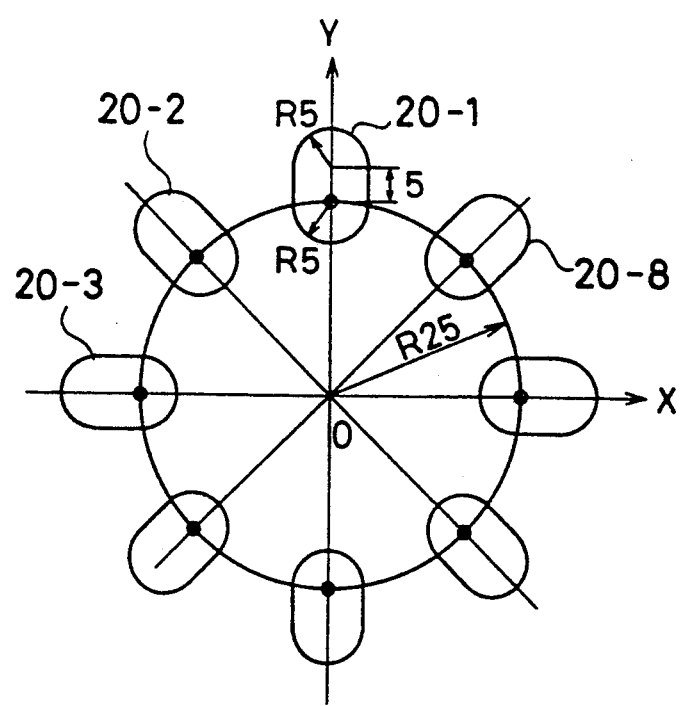
FIG. 5 is a plan view showing, by way of example, an arrangement of the cores to be cut-out machined from the workpiece.

The numerical control unit 11 is arranged to control the operations of the machine body 1, the core removing unit 6 and the peripheral operating sections in accordance with a control program, so as to manufacture a variety of products from the workpiece and to remove cores from the workpiece upwardly or downwardly in dependence on the shape of the respective core which corresponds to a product or an internal cavity to be formed in the product and which has its closed peripheral face. More specifically, the control unit is arranged to cause associated operating sections to be operated in a first operation mode when the cut-out machining of a core which is formed into an inverted trapezoidal shape as viewed in longitudinal cross section to have its upper diameter larger than its lower diameter is completed, so that the inverted trapezoidal core is removed from the workpiece upwardly of the workpiece. On the other hand, after completion of the cut-out machining of a core formed into a trapezoidal shape in longitudinal cross section to have the upper diameter smaller than the lower diameter, the control unit operates to cause the associated operating sections to be operated in a second operation mode, so as to remove the trapezoidal core from the workpiece downwardly of the workpiece. To this end, a code which specifies either one of the first and second operation modes is stated in the control program, together with various statements. For instance, the control program for the machining, in which a first core 20-1 through an eighth core 20-8 (FIG. 5) which are arranged along a circle having a radius of 25 mm and each of which is formed into a trapezoidal shape (FIG. 3) as viewed in longitudinal cross section and an ellipsoidal shape as viewed in plan view are sequentially cut out from the workpiece, contains therein the below-mentioned main program and the below-mentioned sub-program which includes an auxiliary function code "M65" serving as a code representative of the selection of the second operation mode. In the meantime, e.g., an auxiliary function code "M66" is employed for the selection of the first operation mode.

Main Program
G92X0Y25.0;
M50;
M98P2222Q360.0L8;
M60;
M02;

Sub-program
O2222;
G92X0Y25.0I30.0;
M60;
M81;
M82;
M83;
M84;
G42G01Y-5.0;
G52G02X-5.0Y5.0J5.0T1.0;
G01I75.0;
G02X10.0I5.0;
G01Y-5.0;
G02X-5.0Y-5.0I-5.0;
G50G40G01Y5.0;
M00;
M50;
M65;
G00X-17.678Y-7.322;
M00;
M99;

In the following, an operation of the electric discharge machine as constructed above will be explained.

When the first statement "G92X0Y25.0;" is read out from the main program by the central processing unit (CPU) of the computer of the control unit 11, the motor for table drive is operated, so that the workpiece 19 is moved to the initial position (0, 25.0) for the machining of the first core 20-1. Then, in response to the second statement "M50;," the cutting section of the automatic wire extension unit 5 is operated, whereby the wire 9 is cut off. Subsequently, when the third statement "M98P2222Q360.0L8;" (a command for repetitively machining eight times a figure specified by the sub-program within an angular region of 360 degrees) of the main program is read out, the execution of the sub-program whose program number is "2222" is started. First, in response to the second statement "G92X0Y25-.0I30.0;" which follows the first statement "02222;" indicative of the sub-program number, the workpiece is moved to the initial position (0, 25.0) for the machining of the first core. In this case, since the workpiece movement to the initial machining position has been completed in response to the first statement of the main program, the workpiece is not moved. The code "I30.0" represents that the workpiece thickness is 30 mm. Next, the automatic wire extension unit 5 is operated so as to extend the wire 9, in response to the third statement "M60;" (wire extension command) of the sub-program.

When the ninth statement "G52G02X-5.0Y5.0J5.0T1.0;" of the sub-program is read out, the UV unit 4 is horizontally moved so that the wire 9 is inclined by 1.0 degrees to the right side with respect to the perpendicular line, as viewed from the front side. Whereupon, the cut-out machining of the first core 20-1 is carried out in the clockwise direction in FIG. 5 in accordance with the sub-program. Upon completion of the cut-out machining up to the initial machining point, the electric discharge machining is terminated and the wire 9 is cut off, in response to the fifteenth and sixteenth statements "M00;" and "M50;".

Next, in response to the seventeenth statement "M65;," a core removing process is carried out in the second operation mode. More specifically, under the control of the CPU, the Z-axis unit 2 is moved upwardly, one of the cylinder chambers of the vertical cylinder 14 is supplied with the pressurized air from the pressurized air source so that the piston 15 of the cylinder is moved downwardly, and then the motor 17 is rotated to cause the piston 15 to rotate over approximately 180 degrees. As a result, the core sucking section 16 is moved from its home position shown by the solid line in FIG. 2 to a predetermined position located between the upper nozzle 3 and the core 20 (here, the first core 20-1) which has been cut out from the workpiece and placed on the lower nozzle 8. Then, the Z-axis unit 2 is moved downwardly so as to cause the suction pads 18 provided at the bottom face of the core sucking section 16 to be brought in the vicinity of or in contact with the upper face of the workpiece 19. Whereupon, the on-off valve is opened to supply vacuum pressure from the vacuum unit to the suction pads 18. As a result, the core 20 is sucked by the suction pads 18, so as to be held within the workpiece 19 at the core position where the core has been located until the cut-out machining has been completed. Next, the pressurized air is supplied from the pressurized air source to the horizontal cylinder 12, so as to cause the piston 13 to horizontally project from the horizontal cylinder body. With this piston projection, the vertical cylinder 14, the core sucking section 16 and the core 20 sucked by the sucking section are moved horizontally in the direction away from the upper nozzle. Whereupon, the motor for table drive is driven in synchronism with the projection of the piston 13, so as to cause the table 10 to move horizontally in such a manner that the workpiece 19 is moved horizontally in unison with the core 20.

When the core 20 reaches the outside of the region in which the falling of the core is to be prohibited and the lower nozzle 8 and the lower arm 7 are disposed, the drive of the table drive motor and the supply of the pressurized air to the horizontal cylinder 12 are stopped, to thereby cause the movements of the workpiece 19 and the core 20 to stop. Whereupon, the on-off valve is closed to stop the supply of the vacuum pressure to the suction pads 18. As a result, the core 20 naturally falls from the workpiece 19, and is removed from the workpiece.

Next, the pressurized air is supplied to the other cylinder chamber of the horizontal cylinder 12, so that the piston 13 is retreated until the core sucking section 16 is positioned at a location just beneath the upper nozzle 3. Then, the motor 17 is reversely rotated over approximately 180 degrees, to cause the core sucking section 16 to be positioned at its initial rotary position. Whereupon the pressurized air is supplied to the other cylinder chamber of the vertical cylinder 14, so that the piston 15 is moved upwardly until the core sucking section 16 is positioned at its home position, whereby the core removing process in the second operation mode is completed.

Subsequently, each time the cut-out machining of each of the second core 20-2 through the eighth core 20-8 is completed, the core removing process according to the second operation mode is carried out. When the last statement "M99;" is read out from the sub-program, returning to the main program is made. Then, the wire extension is carried out in response to the fourth statement "M60;" of the main program. When the last statement "M02;" is read out, the main program is completed.

Figure 6:
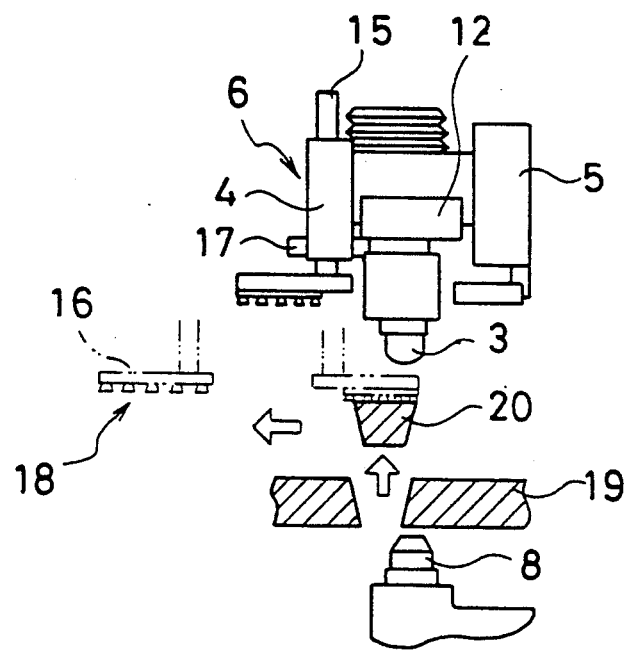
FIG. 6 is a view showing a core removing process in a first operation mode.
Figure 7:
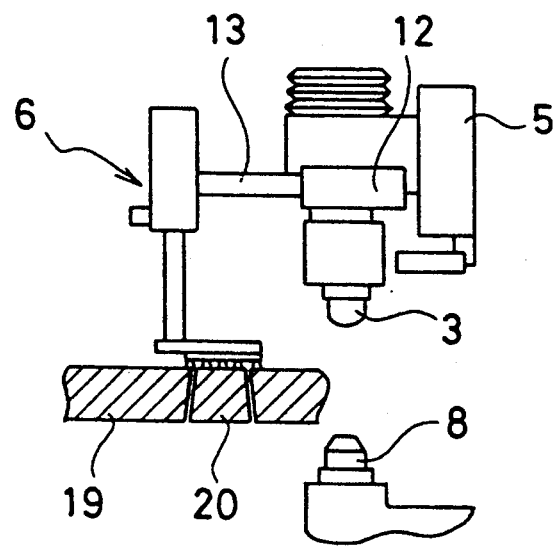
FIG. 7 is a view showing a core removing process in a second operation mode.

After completion of the cut-out machining of a core formed into an inverted trapezoidal shape in longitudinal cross section, which machining is carried out in accordance with a program other than the main program and the aforementioned sub-program, when the code, e.g., the auxiliary function code "M66," which specifies a core removing process according to the first operation mode is read out from the just-mentioned program, the core sucking section 16 is moved from its home position to a position beneath the upper nozzle as a result of upward movement of the Z-axis unit 2, downward movement of the piston 15 and rotation of the motor 17. Further, the Z-axis unit 2 is moved downwardly until the core sucking section is brought in contact with the upper face of the core 20 cut out from the workpiece 19, and then the core 20 is sucked and held by the suction pads 18. Next, the core sucking section 16 is moved upwardly, with the upward movement of the Z-axis unit 2, so that the core 20 is pulled out from the workpiece 19 upwardly, as shown in FIG. 6. Further, the motor 17 is rotated reversely to cause the core sucking section 16 to be positioned at its initial rotary position. Whereupon, the piston 13 projects horizontally, so that the core 20 sucked by the core sucking section 16 is moved horizontally. Meanwhile, the workpiece table 10 is not horizontally moved. When the core 20 reaches the outside of the core falling prohibition region, the movement of the piston 13 and the supply of vacuum pressure to the suction pads 18 are stopped. As a result, the core 20 is disengaged from the core sucking section 16, to be permitted to fall. Next, the piston 13 is caused to be retreated, and the piston 15 is moved upwardly until the core sucking section 16 is positioned at its home position, whereby the core removing process according to the first operation mode is completed.

With regard to a core, e.g., a cylindrical core, whose outer periphery extends vertically of the XY horizontal plane and permitted to be disengaged from the workpiece upwardly and downwardly of the workpiece, either one of the auxiliary function codes M65 and M66 is employed, in the present embodiment, as the operation mode specifying code. Thus, even if cores removable from the workpiece only upwardly of the workpiece, cores removable only downwardly of the workpiece, and cores removable only downwardly of the workpiece, and cores removable in both the upward and downward directions are mixedly arranged in the single workpiece, these cores can be removed from the workpiece by causing the core removing unit 6, etc. to operate, under the control of the control unit 11, in the first or second operation mode which is suitable to the core shape.

The present invention is not limited to the aforementioned embodiment, and various modifications thereof may be made. For instance, in the second operation mode of the embodiment, the core cut out from the workpiece is delivered in unison with the workpiece to the outside of the region where the core falling is prohibited, and then the natural fall of the core is caused. Alternatively, the core may be disengaged from the core sucking section so as to permit the natural core falling after the core is moved in unison with the workpiece to a safety position at which the core never collides with the lower nozzle and the lower arm even if the core falling occurs. Then, the fallen core may be delivered, by the use of a belt conveyer or a delivery arm operable under the control of the control unit, to the outside of the core falling prohibition region.

We claim:

1. A core removing apparatus, comprising:
   suction means for detachably sucking a core, cut out from a workpiece, at an upper face of the core;
   first drive means for causing said suction means to move vertically and horizontally;
   second drive means for causing the workpiece to move horizontally; and
   control means for selecting either one of first and second operation modes in dependence on a core shape, and for causing said suction means and said first and second drive means to operate in the selected one operation mode;
   wherein, in the first operation mode, said suction means by which the core is sucked is moved upwardly of the workpiece and then to the outside of a prohibition region, and then the core is disengaged from said suction means, and, in the second operation mode, said suction means and the workpiece are caused to move horizontally to the outside of the prohibition region, with the core sucked by said suction means to be held within the workpiece, and then the core is disengaged from said suction means.

2. A core removing apparatus according to claim 1, wherein said control means is operable in accordance with a control program, said control means being operable to select the first operation mode when it reads out a first code from the control program, and select the second operation mode when it reads out a second code.

3. A core removing apparatus according to claim 1, wherein said core removing apparatus is mounted on an electric discharge machine having a nozzle and an arm which supports said nozzle, and further comprises delivery means which is operated under control of said control means; and
   wherein, in the second operation mode, the core is moved to a safety position at which the core never collides with said nozzle of the electric discharge machine and said arm which supports the nozzle, with the core held within the workpiece, and is then disengaged from the workpiece, to thereby permit natural falling of the core from the workpiece onto said delivery means, and the fallen core is delivered to the outside of the prohibition region by means of said delivery means.

* * * * *